United States Patent Office 3,577,459
Patented May 4, 1971

3,577,459
N-ALKYL AND N,N-DIALKYL ALKANESULFON-
AMIDE BIS(ALKYLIMINES) AND N-ALKYL AND
N,N-DIALKYL ALKYLIMINES AND PROCESSES
FOR PREPARING SAME
Robert G. Laughlin, Springfield Township, Hamilton
County, Ohio, assignor to The Procter & Gamble Company, Cincinnati, Ohio
No Drawing. Filed May 20, 1968, Ser. No. 730,637
Int. Cl. C01c 145/00
U.S. Cl. 260—551       17 Claims

ABSTRACT OF THE DISCLOSURE

Novel N-alkyl and N,N-dialkyl alkanesulfonamide bis-(alkylimine) and N-alkyl and N,N-dialkyl alkanesulfonamide alkylimine compounds and novel processes for their preparation. These compounds have utility as extreme pressure lubricant additives, as anti-microbial agents and as accelerators in the synthesis of rubber.

BACKGROUND OF THE INVENTION

This invention relates to a novel class of sulfur-nitrogen-containing organic compounds. More particularly, the present invention relates to novel N-alkyl and N,N-dialkyl alkanesulfonamide bis(alkylimines) and N-alkyl and N,N-dialkyl alkanesulfonamide alkylimines. The novel compounds of the present invention can be utilized as additives to lubricant formulations to enable such formulations to withstand higher than normal pressures, as anti-microbial agents and as accelerators in the synthesis of rubber, as more fully described hereinafter. In addition to the novel compounds themselves, the present invention also relates to the processes for preparing these novel compounds.

Various compounds containing semi-polar sulfur-nitrogen bonds similar to those of the novel compounds of the present invention have recently been disclosed, including sulfone imines (see J. S. Berry, U.S. Pat. 3,255,166, issued June 7, 1966), and sulfone diimines [see R. G. Laughlin et al., J. Am. Chem. Soc., 89, 2435 (1967)]. Moreover, cyclic sulfonamide imines have been prepared from sulfinamide imines by a permanganate oxidation process [see Kresse et al., Chem. Ber. 3933 (1965)] and aromatic sulfonamide imines have been prepared from sulfinamide imines by a bromine water oxidation process [see Takei et al., Bull. Chem. Soc. Japan, 38, 1979 (1965)]. However, there are no disclosures in the literature relative to the production of aliphatic sulfonamide imines from the corresponding aliphatic sulfinamide imines by oxidation or other processes. One possible explanation for the absence of a synthesis of the aliphatic sulfonamide imines from aliphatic sulfenamide imines is that the latter compounds have not been synthesized.

It is, therefore, an object of the present invention to provide a novel class of sulfur-nitrogen-containing organic compounds.

It is a further object of the present invention to provide novel N-alkyl and N,N-dialkyl alkanesulfonamide bis (alkylimines).

It is a still further object of the present invention to provide novel N-alkyl and N,N-dialkyl alkanesulfonamide alkylimines.

It is yet another object of the present invention to provide novel processes for the preparation of the aforesaid novel sulfur-nitrogen-containing organic compounds.

Other objects and advantages of the present invention will be readily apparent to one skilled in the art from the following description.

SUMMARY OF THE INVENTION

The novel sulfur-nitrogen containing organic compounds of the present invention are of the general formula:

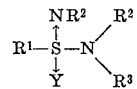

wherein $R^1$ is selected from the group consisting of straight chain alkyl and branched chain alkyl containing from 1 to about 20 carbon atoms; $R^2$ is selected from the group consisting of straight chain alkyl and branched chain alkyl containing from 1 to about 4 carbon atoms; $R^3$ is selected from the group consisting of hydrogen, straight chain alkyl and branched chain alkyl containing from 1 to about 4 carbon atoms and Y is selected from the group consisting of $NR^2$ and oxygen.

The N-alkyl and N,N-dialkyl alkanesulfonamide bis (alkylimines) are of the general formula:

I. 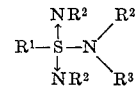

wherein $R^1$, $R^2$ and $R^3$ are as defined heretofore.

The N-alkyl alkanesulfonamide bis(alkylimines) are prepared in accordance with the process of this invention by reacting an aliphatic mercaptan with an alkylchloramine in the presence of an alkylamine. The N,N-dialkyl alkanesulfonamide bis(alkylimines) are prepared by reacting the corresponding N-alkyl alkanesulfonamide bis (alkylimine) with a strong base to form an ionic intermediate which is then alkylated with an alkylating agent. Alternatively, the N,N-dialkyl alkanesulfonamide bis (alkylimines) are prepared by reacting the corresponding N,N-dialkyl alkanesulfonamide with an alkylchloramine in the presence of a dialkylamine.

The N-alkyl and N,N-dialkyl alkanesulfonamide alkylimines are of the general formula:

II. 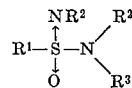

wherein $R^1$, $R^2$ and $R^3$ are as defined heretofore.

The N-alkyl alkanesulfonamide alkylimines are prepared in accordance with this invention by acid hydrolysis of the corresponding N-alkyl alkanesulfonamide bis(alkylimines). The N,N-dialkyl alkanesulfonamide alkylimines are prepared by reacting the corresponding N-alkyl alkanesulfonamide alkylimines with a strong base followed by alkylation with an alkylating agent.

DETAILED DESCRIPTION OF THE INVENTION

When $R^3$ in Formula I above is hydrogen, the compound is an N-alkyl alkanesulfonamide bis(alkylimine) and when $R^3$ is an alkyl group the compound is an N,N-dialkyl alkanesulfonamide bis(alkylimine). Specific examples of the N-alkyl alkanesulfonamide bis(alkylimines) of this invention include:

N-methyl methanesulfonamide bis(methylimine);
N-methyl ethanesulfonamide bis(ethylimine);
N-methyl butanesulfonamide bis(methylimine);
N-ethyl tert-butanesulfonamide bis(propylimine);
N-propyl octanesulfonamide bis(tert-butylimine);
N-methyl dodecanesulfonamide bis(methylimine);
N-butyl 3-methylpentadecanesulfonamide bis(ethylimine);
N-ethyl 4-ethyldecanesulfonamide bis(propylimine);
N-isopropyl pentanesulfonamide bis(butylimine); and
N-methyl eicosanesulfonamide bis(methylimine).

Specific examples of the N,N-dialkyl alkanesulfonamide bis(alkylimines) include:

N,N-dimethyl methanesulfonamide bis(methylimine);
N,N-dimethyl dodecanesulfonamide bis(methylimine);
N-methyl, N-ethyl octanesulfonamide bis(propylimine);
N-ethyl, N-butyl eicosanesulfonamide bis(butylimine);
N,N-dibutyl 3-methylpentadecanesulfonamide bis(ethylimine); and
N,N-diisopropyl pentanesulfonamide bis(tert-butylimine).

When $R^3$ in Formula II above is hydrogen, the compound is an N-alkyl alkanesulfonamide alkylimine and when $R^3$ is alkyl the compound is an N,N-dialkyl alkanesulfonamide alkylimine. Specific examples of the N-alkyl alkanesulfonamide alkylimines include:

N-methyl methanesulfonamide methylimine;
N-methyl ethanesulfonamide ethylimine;
N-methyl butanesulfonamide methylimine;
N-ethyl tert-butanesulfonamide propylimine;
N-propyl octanesulfonamide tert-butylimine;
N-methyl dodecanesulfonamide methylimine;
N-butyl 3-methylpentadecanesulfonamide ethylimine;
N-ethyl 4-ethyl decanesulfonamide propylimine;
N-isopropyl pentanesulfonamide butylimine; and
N-methyl eicosanesulfonamide methylimine.

Specific examples of the N,N-dialkyl alkanesulfonamide alkylimines include:

N,N-dimethyl methanesulfonamide methylimine;
N,N-dimethyl dodecanesulfonamide methylimine;
N-methyl, N-ethyl octanesulfonamide propylimine;
N-ethyl, N-butyl eicosanesulfonamide butylimine;
N,N-dibutyl 3-methylpentadecanesulfonamide ethylimine; and
N,N-diisopropyl pentanesulfonamide tert-butylimine.

The N-alkyl alkanesulfonamide bis(alkylimines) are prepared in accordance with the process of the present invention by reacting an aliphatic mercaptan having the general formula:

$$R^1SH$$

wherein $R^1$ is selected from the group consisting of straight chain alkyl and branched chain alkyl containing from 1 to about 20 carbon atoms, with an alkylchloramine having the general formula:

$$R^2HNCl$$

wherein $R^2$ is selected from the group consisting of straight chain alkyl and branched chain alkyl containing from 1 to about 4 carbon atoms, in the presence of an alkylamine having the general formula:

$$R^4NH_2$$

wherein the alkyl group $R^4$ is selected from the group consisting of straight chain alkyl and branched chain alkyl containing from 1 to about 20 carbon atoms.

The general reaction of this process of the present invention is illustrated by the equation below:

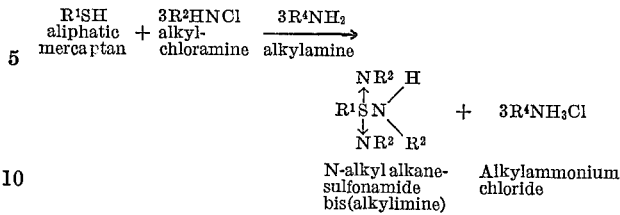

The above equation depicts the sulfur-nitrogen bond as being of a semipolar nature and it is thus depicted as a convenient way of representation. It is recognized that other ways of representing the actual bonding are used and may be equally suitable.

Preferably, the reaction is carried out by forming a reaction mixture comprised of the aliphatic mercaptan, alkylchloramine and alkylamine in a suitable solvent as hereinafter defined under an inert atmosphere (e.g. nitrogen) and at a temperature of from about $-20°$ C. to about $40°$ C., more preferably from about $0°$ C. to about $5°$ C., for a period of from about 1 hour to about 16 hours, more preferably about 2 hours. The reaction is normally carried out at atmospheric pressure.

Aliphatic mercaptans which can be utilized as reactants in this process have the general formula $R^1SH$ wherein $R^1$ is as defined above. Selection of this reactant is of course determined by the desired end product. Examples of specific aliphatic mercaptans which can be utilized in the present invention include, for example, methyl mercaptan, ethyl mercaptan, n-butyl mercaptan, tert-butyl mercaptan, octyl mercaptan, dodecyl mercaptan, 3-methylpentadecyl mercaptan, 4-ethyldecanyl mercaptan, and eicosyl mercaptan. Any aliphatic mercaptans within the above limitations are suitable in the process of the present invention with the only reservation being that certain of these aliphatic mercaptans yield products which are easier to isolate and purify than others.

As stated above, alkylchloramines having the general formula $R^2HNCl$ wherein $R^2$ is as defined above can be utilized in the process of the present invention. N-methyl alkanesulfonamide bis(methylimines) and N-methyl-N-alkyl alkanesulfonamide bis(methylimines) are more readily prepared by this process than other N-alkyl alkanesulfonamide bis(alkylimines) of this invention because of the availability and reactivity of methylchloramine which yields these products. Methylchloramine is easily synthesized by standard and well known procedures. The longer chain or branched chain alkylchloramines can also be prepared by well known methods, but they do not react as readily with the aliphatic mercaptan. In general, more rigorous conditions of temperature and time are required to effect the reaction when these higher alkylchloramines are used.

Other suitable alkylchloramines useful in the present invention include ethylchloramine, isopropylchloramine, n-propylchloramine, n-butylchloramine and tert-butylchloramine. It is preferred that the alkylchloramine be in an anhydrous state because the intermediates formed during the reaction of the present invention are hydrolytically reactive and may react to some degree with any water present in the reaction system.

Although from about 2.5 to about 5 moles of alkylchloramine per mole mercaptan can be used, three moles of alkylchloramine are preferably employed for each mole of mercaptan in order to achieve stoichiometric balance. If less than about 2.5 moles of alkylchloramine per mole of mercaptan are used the reaction will not proceed to completion. Amounts of alkylchloramine greater than three moles per mole of mercaptan offer no added benefits to the overall reaction, however, up to five moles of alkylchloramine per mole of mercaptan can be used without any harmful effects.

As hereinbefore stated, the reaction between the aliphatic mercaptan and the alkylchloramine is carried out in the presence of an alkylamine. It is essential that an alkylamine be utilized in order to accept the hydrogen chloride molecules from the intermediate products being formed to allow the reaction to continue to completion. Akylamines of the general formula $R^4NH_2$, wherein $R^4$ is as defined above are utilized for this purpose. Preferably, the alkylamine corresponding to the alkylchloramine employed in the reaction is utilized. The use of such a corresponding alkylamine is desirable because of its availability as a by-product in the formation of the alkylchloramine.

From about 2.5 to about 5.0 moles of alkylamine per mole of aliphatic mercaptan can be utilized in the present process. At least about 3 moles of alkylamine are preferred in order to take up the corresponding number of hydrogen chloride molecules being formed in the reaction mixture to expedite completion of the reaction. If less than about 2.5 moles of alkylamine per mole of mercaptan is employed, the reaction will not proceed to completion. Rather, it will yield only unstable, inseparable intermediate products. The use of more than 5 moles of alkylamine per mole of mercaptan serves no useful purpose.

Preferably, the foregoing reactants are in dilute solution during the reaction period. Suitable solvents for use in this process include any organic solvent which is compatible with and inert to the aliphatic mercaptans, alkylchloramines and alkylamines. Suitable solvents include chloroform, acetonitrile, methylene chloride and benzene. Other suitable organic solvents will be readily apparent to those skilled in the art.

The N-alkyl alkanesulfonamide alkylamines of the present invention can be readily prepared by acid hydrolysis of the corresponding N-alkyl alkanesulfonamide bis(alkylamines). This facile hydrolysis reaction is surprising and unexpected because the sulfur-nitrogen semipolar bonds in similar compounds, e.g., sulfone imines and sulfone diimines, are extremely resistant to hydrolysis. (See R. G. Laughlin et al., J. Am. Chem. Soc., supra.) Moreover, it is known that other sulfonamides are extremely difficult to hydrolyze, requiring concentrated acid, high temperatures and long periods of time. [See Noller, Chem. Org. Compounds, W. B. Sanders & Co., Philadelphia, 2nd ed., 472 (1951).] It is essential that this be an acid hydrolysis as the reaction will not proceed when a base is used in place of the acid.

The hydrolysis of an N-alkyl alkanesulfonamide bis (alkylimine) to the corresponding N-alkyl alkanesulfonamide alkylimine of the present invention proceeds as follows: a reaction mixture of an N-alkyl alkanesulfonamide bis(alkylamine), water and dilute acid is agitated for a time sufficient to essentially completely hydrolyze the N-alkyl alkanesulfonamide bis(alkylimine). Depending on the concentration of N-alkyl alkanesulfonamide bis(alkylimines) in the reaction mixture, the dilution of the acid, temperature and degree of agitation, from about 5 minutes to about 45 minutes is required. Any water-soluble acid which substantially dissociates in water is suitable for use in this process. A preferred acid for this hydrolysis process is hydrochloric acid because of its availability and reactivity. Other suitable acids include sulfuric acid, nitric acid, phosphonic acid, acetic acid, formic acid and propionic acid. To insure completeness of the reacton, it is desirable to reflux the aqueous reaction mixture for a period of about 30 minutes, although the reaction normally proceeds at room temperature. It is preferred for stoichiometric requirements to use about 2 moles of acid for each mole of N-alkyl alkanesulfonamide bis(alkylimine) to be converted to assure completeness of the reaction.

The novel N,N-dialkyl alkanesulfonamide bis(alkylimines) and N,N-dialkyl alkanesulfonamide alkylimines of the present invention can be prepared by the following process. The N-alkyl alkanesulfonamide bis(alkylimine) or N-alkyl alkanesulfonamide alkylimine is treated with a strong base (e.g., sodium hydride, lithum methoxide, potassium tert-butoxide etc.) preferably in the presence of an inert solvent (e.g., monoglyme), to form an anionic intermediate which is then alkylated with an alkylating agent (e.g. alkyl halides, dialkyl sulfates, alkyl alkanesulfonates, alkyl arylsulfonates, etc.) to form the desired N,N-dialkyl alkanesulfonamide bis(alkylimine) or N,N-dialkyl alkanesulfonamide alkylimine.

The general reaction of this process of the present invention is illustrated by the equation below:

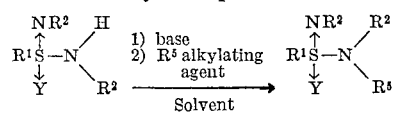

wherein $R^1$, $R^2$, and Y are as hereinbefore defined; $R^5$ is selected from the group consisting of a straight chain alkyl and branched chain alkyl containing from 1 to about 4 carbon atoms.

The reaction is preferably carried out in an inert organic solvent, i.e., one that is compatible with and inert to the reactants (e.g., monoglyme), by forming a reaction mixture comprised of the N-alkyl alkanesulfonamide bis(alkylimine) or N-alkyl alkanesulfonamide alkylimine, strong base and alkylating agent, preferably under an inert atmosphere (e.g., argon), at a temperature of from about 0° C. to about 50° C., preferably about 20° C. to about 30° C., for a period of from about 5 minutes to about 2 hours, more preferably from about 10 minutes to about 1 hour. The reaction is normally carried out at atmospheric pressure.

Sodium hydride is a preferred base in the above reaction since it is highly reactive and promotes a facile and complete reaction. The alkylating agents suitable for use in the present invention include alkyl halides (e.g. methyl iodide, methyl bromide, ethyl chloride, n-butyl bromide and isopropyl chloride), dialkyl sulfates (e.g. dimethyl sulfate, diethyl sulfate), alkyl alkanesulfonates (e.g. methyl methanesulfonate, ethyl n-propanesulfonate) and alkyl arylsulfonates (e.g., methyl benzenesulfonate, methyl toluenesulfonate). The alkyl chain length selected depends on the desired chain length of the alkyl group in the final product.

The novel N,N-dialkyl alkanesulfonamide bis(alkylimines) of the present invention can also be prepared according to the following procedure. An N,N-dialkyl alkanesulfenamide [see Khorasch Organic Sulfur Compounds, vol. 1, Permagon Press, New York, 354 (1961)] is reacted with alkylchloramine in the presence of dialkylamine to form the desired N,N-dialkyl alkanesulfonamide bis(alkylamine).

The general reaction of this process is illustrated by the following general equation:

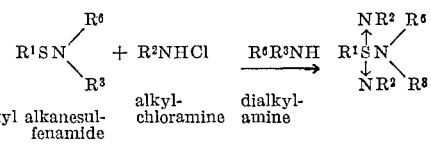

In the above reaction $R^1$, $R^2$ and $R^3$ are as previously defined and $R^6$ is selected from the group consisting of straight chain alkyl containing from 1 to about 20 carbon atoms.

It is essential in this process of the invention that the alkyl substituents on the nitrogen atoms of the N,N-dialkyl alkanesulfenamide and the dialkylamine, i.e., $R^3$ and $R^6$, be the same in order to obtain the desired product. This is because the nitrogens in these compounds readily interchange during the reaction and if the substituents on these reagents are not the same, a mixture of products rather than the desired product will result.

The reaction is preferably carried out in a suitable inert organic solvent as hereinbefore characterized, by forming a reaction mixture of N,N-dialkyl alkanesulfenamide, alkylchloramine and dialkylamine, preferably under an inert atmosphere (e.g., nitrogen) at a temperature of about −20° C. to about 40° C., preferably about 20° C. for a period of from about 2 hours to about 24 hours, preferably about 16 hours.

As hereinbefore stated, the novel sulfur-nitrogen-containing organic compounds of the present invention can be utilized as extreme pressure additives for lubricants. When these additives are utilized at from about 0.5% to about 70%, preferably from about 2% to about 15% of the total composition they allow the lubricants to withstand higher than normal pressures without losing their effectivness as lubricants. Specific compounds preferred for this purpose include N-methyl methanesulfonamide bis(methylimine); N - methyl butanesulfonamide bis (methylimine); N-methyl dodecanesulfonamide bis(methylimine); N-methyl butanesulfonamide methylimine; and N-methyl dodecanesulfonamide methylimine.

The lubricants with which these novel compounds may be used to obtain superior lubricant compositions can be broadly described as hydrocarbon mineral base oils, synthetic lubricating base oils or mixtures thereof. Suitable lubricants include paraffinic and naphthenic base oils (e.g. Kendall SAE 10), mono- and polybasic acid esters [e.g., bis(2-ethylhexyl) sebacate], polyglycols (e.g. polyethylene glycol), dithioesters (e.g. di-n-octyl thioadipate), organo silicones, and the like.

The following examples will illustrate in detail the manner in which the invention can be practiced. It will be understood, however, that the invention is not confined to the specific limitations set forth in the individual examples but rather to the scope of the appended claims.

PREFERRED EMBODIMENTS

Example I

Preparation of N-methyl butanesulfonamide bis(methylimine).—A dry, 1 liter flask fitted with an addition funnel, a nitrogen inlet and a mechanical stirrer was charged with a solution of 69.5 grams (1.06 moles) of methylchloramine and 98.5 grams (3.18 moles) of methylamine in 450 ml. of chloroform and a nitrogen atmosphere was introduced. A solution of 27.0 grams (0.30 mole) of n-butyl mercaptan was added dropwise at a temperature of about 0° C. for a period of 25 minutes with mechanical stirring. This reaction mixture was allowed to stand for approximately 2 hours at room temperature with mechanical stirring to insure completion of the reaction. The reaction mixture was then filtered utilizing vacuum filtration. The filtrate and washings were then partially evaporated, refiltered and the evaporation completed. The resulting product was dissolved in chloroform and washed with a 50% aqueous solution of potassium carbonate until it was free of chloride and the chloroform solvent was then removed by evaporation. The residue was purified by distillation.

This purified material exhibited B.P. ca. 107° C. (.04 mm.) and M.P. ca. 45° C. The theoretical calculation for $C_4H_9S$ $(NCH_3)_2NHCH_3$: C, 47.4; H, 10.8; S, 18.1; N, 23.7 was compared with the actual found C, 46.1; H, 10.8; S, 18.2 and N, 23.7. The elemental analysis, nuclear magnetic resonance spectra and a general knowledge of the entire synthetic process permitted positive identification of the product as N-methyl butanesulfonamide bis (methylimine).

When ethyl mercaptan, tert-butyl mercaptan, octyl mercaptan, 3-methylpentadecyl mercaptan, 4-ethyldecanyl mercaptan, and eicosyl mercaptan are substituted on an equimolar basis for n-butyl mercaptan in the process of Example I, substantially equivalent results are obtained in that comparable yields of the corresponding N-methyl alkanesulfonamide bis(alkylimines) are obtained.

When ethylchloramine, isopropylchloramine, n-butylchloramine and tert-butylchloramine, respectively, are substituted on an equimolar basis for the methylchloramine of Example I, substantially equivalent results are obtained in that comparative yields of the corresponding N-alkyl butanesulfonamide bis(alkylimine) compounds are obtained.

When in the reaction of Example I ethylamine, isopropylamine, n-butylamine and tert-butylamine are substituted on an equimolar basis for the methylamine, substantially equivalent results are obtained in that comparative yields of N-methyl butanesulfonamide bis(methylimine) are obtained.

Example II

Preparation of N-methyl methanesulfonamide bis (methylimine).—Methyl mercaptan was substituted for n-butyl mercaptan on an equimolar basis in the process of Example I and the purified product exhibited a B.P. 70° C. (0.1 mm.). The theoretical calculation for

$$CH_3S(NCH_3)_2NHCH_3$$

C, 35.5; H, 9.7; S, 31.1; N, 23.7 was compared with the actual found C, 35.6; H, 9.85; S, 31.2; N, 23.6. The elemental analysis, nuclear magnetic resonance spectra, and a general knowledge of the entire synthetic process permitted positive identification of the product as N-methyl methanesulfonamide bis(methylimine).

Example III

Preparation of N-methyl dodecanesulfonamide bis methylimine).—Dodecyl mercaptan was substituted for n-butyl mercaptan on an equimolar basis in the process of Example I and the purified product was analyzed. The theoretical calculation for $C_{12}H_{25}S(NCH_3)_2NHCH_3$; C, 62.2; H, 12.2; S, 11.1; N, 14.5 was compared with the actual found C, 61.7; H, 13.8; S, 11.2; N, 13.9. The elemental analysis, nuclear magnetic resonance spectra, and a general knowledge of the entire synthetic process permitted positive identification of the product as N-methyl dodecanesulfonamide bis(methylimine).

Example IV

Preparation of N-methyl butanesulfonamide methylimine.—A 250 ml. flask fitted with a reflux condensor was maintained under a nitrogen atmosphere. The flask was charged with 25.7 grams (.145 mole) of N-methyl butanesulfonamide bis(methylimine). 75 ml. of 6 N hydrochloric acid was added at once and the resulting mixture was refluxed for 30 minutes. After cooling, the aqueous solution was saturated with potassium carbonate and the crude product was extracted utilizing isopropanol. The isopropanol was then evaporated and the residue purified by distillation.

This purified material exhibited B.P. 73° C. (.05 mm.) and M.P. ca. 40° C. The theoretical calculation for $C_4H_9S(O)(NCH_3)NHCH_3$; C, 29.7; H, 8.3; S, 26.2; N, 22.9 was compared with the actual found C, 30.3; H, 8.4; S, 26.0 and N, 22.9. The elemental analysis, nuclear magnetic resonance spectra, and a general knowledge of the entire synthetic process, permitted positive identification of the product as N-methyl butanesulfonamide methylimine.

When N-ethyl tert-butanesulfonamide bis(propylimine), N-isopropyl pentanesulfonamide bis(butylimine), and N-methyl dodecanesulfonamide bis(methylimine) are substituted for N-methyl butanesulfonamide bis(methylimine) in the process of Example IV substantially equivalent results are obtained in that the resulting products are N-ethyl tert-butanesulfonamide propylimine, N-isopropyl-pentanesulfonamide butylimine and N-methyl dodecanesulfonamide methylimine, respectively.

When sulfuric, nitric, phosphonic, acetic, formic and propionic acids, respectively, are employed in place of hydrochloric acid in an amount sufficient to provide equivalent hydrogen ion concentration, substantially equivalent results are obtained.

Example V

Preparation of N,N-dimethyl methanesulfonamide bis(methylimine).—A 100 ml., three-necked flask was charged with 0.90 gram (0.375 mole) of sodium hydride suspended in mineral oil. The mineral oil was washed free with hexane and removed by decantation under argon. 40 ml. of monoglyme was added and the apparatus connected to an inverted water-filled one liter graduate cylinder through a drying tube containing anhydrous calcium sulfate. 3.66 grams (.030 mole) of N-methyl methanesulfonamide bis(methylimine) in 10 ml. of monoglyme was added dropwise. After a gas evolution was complete, 4.7 grams (.033 mole) of methyl iodide was added at a temperature of about 45° C. and the reaction mixture was stirred for about 1 hour. The monoglyme layer was evaporated and the residue was extracted with benzene and further purified by distillation.

This purified material exhibited B.P. 52° C. (.05 mm.) and the theoretical calculation for $$CH_3S(NCH_3)_2N(CH_3)_2$$

C, 40.2; H, 10.1; S, 21.5; N, 28.1 was compared with the actual found C, 40.1; H, 9.8; S, 21.4; and N, 27.8. The elemental analysis, nuclear magnetic resonance spectra, and a general knowledge of the entire synthetic process permitted positive identification of the product as N,N-dimethyl methanesulfonamide bis(methylimine).

When lithium methoxide and potassium tert-butoxide are substituted on an equimolar basis for sodium hydride in the process of Example III substantially equivalent results are obtained in that comparative yields of N,N-dimethyl methane-sulfonamide bis(methylimine) are obtained.

When methyl bromide, ethyl chloride, n-butyl bromide, isopropyl chloride, dimethyl sulfate, diethyl sulfate, methyl methanesulfonate, ethyl n-propanesulfonate, methyl benzenesulfonate and methyl toluenesulfonate are substituted on an equimolar basis for methyl iodide in the process of Example III substantially equivalent results are obtained in that comparative yields of N,N-dimethyl methanesulfonamide bis(methylimine) are obtained.

Example VI

Preparation of N,N-dimethyl methanesulfonamide methylimine.—N-methyl methanesulfonamide methylimine was substituted for N-methyl methanesulfonamide bis(methyl-imine) on an equimolar basis in the process of Example III and the purified product exhibited a B.P. 45° C. (0.14 mm.). The theoretical calculation for $$CH_3S(O)(NCH_3)N(CH_3)_2$$

C, 35.3; H, 8.9; S, 23.5; N, 20.6 was compared with the actual found C, 35.5; H, 8.9; S, 23.6; N, 20.2. The elemental analysis, nuclear magnetic resonance spectra, and a general knowledge of the entire synthetic process permitted positive identification of the product as N,N-dimethyl methanesulfonamide methylimine.

Example VII

Preparation of N,N-dimethyl methanesulfonamide bis(methylimine).—A dry, 1 liter flask fitted with an addition funnel, a nitrogen inlet and a mechanical stirrer was charged with a solution of 135 grams (3.0 moles) of dimethylamine and 50.5 grams (0.50 mole) of N,N-dimethyl methanesulfenamide in about 500 ml. of acetonitrile. The solution was then added to 85.1 grams (1.30 moles) of methylchloramine at 20° C. for an overnight period with mechanical stirring. The reaction mixture was then filtered and the filtrate washed free of chloride with a 50% potassium carbonate solution. The acetonitrile was then evaporated and the residue purified by distillation.

This purified material exhibited the same boiling point and infrared spectrum as the product of Example III and was identified as N,N-dimethyl methanesulfonamide bis(methylimine).

The novel compounds of the above examples are tested utilizing the Shell Four Ball Extreme Pressure Test as described in the Precision Shell Four Ball Manual TS 75015 published by Precision Scientific Company, Chicago, Ill. This test is conducted on a machine wherein one steel ball contacts and rotates upon three stationary steel balls of identical physical properties and tests lubricants under load conditions required for seizure of the four balls. The test is as follows: 5% by weight of the compound to be tested is added to a Kendall (additive free) SAE 10 mineral oil. A composition comprising 5% by weight of SCL (a commercial extreme pressure additive manufactured by Elco Lubricant Corporation) in Kendall SAE 10 mineral oil serves as a positive control and the oil without additive serves as a negative control. Each composition is tested for identical time periods of 1 minute and a weld point reading in kilograms is taken. The results of tests on representative N-alkyl alkanesulfonamide bis(alkylimines), N-alkyl alkanesulfonamide alkylimines and control compositions are shown below.

| Ex. | 5% by weight additive in Kendall SAE 10 | Weld point (kgs.) |
| --- | --- | --- |
| VIII | N-methyl methanesulfonamide bis(methylimine) | 240 |
| IX | N-methyl butanesulfonamide bis(methylimine) | 240 |
| X | N-methyl dodecanesulfonamide bis(methylimine) | 220 |
| XI | N-methyl methanesulfonamide methylimine | 220 |
| XII | N-methyl dodecanesulfonamide methylimine | 190 |
| | "SCL" (control) | 250 |
| | Kendall SAE 10 additive-free (control) | 120 |

This test demonstrates the utility of the novel compounds of the present invention as extreme pressure additives in lubricants.

When bis(2-ethylhexyl)sebacate, polyethylene glycol and di-n-octyl thioadipate are substituted for the Kendall SAE 10 in the compositions of Examples VIII through XII substantially equivalent results are obtained in that the lubricant properties of these lubricants under extreme pressure are maintained.

In addition to the preferred embodiments described herein, other arrangements and variations within the spirit and scope of the invention and the appended claims will occur to those skilled in the art.

What is claimed is:
1. A compound of the formula

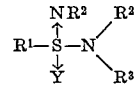

wherein $R^1$ is selected from the group consisting of straight chain alkyl and branched chain alkyl containing from 1 to about 20 carbon atoms; $R^2$ is selected from the group consisting of straight chain and branched chain alkyl containing from 1 to about 4 carbon atoms; $R^3$ is selected from the group consisting of hydrogen, straight chain alkyl and branched chain alkyl containing from 1 to about 4 carbon atoms and Y is selected from the group consisting of $NR^2$ and oxygen.

2. N-methyl methanesulfonamide bis(methylimine).
3. N-methyl butanesulfonamide bis(methylimine).
4. N-methyl dodecanesulfonamide bis(methylimine).
5. N-methyl butanesulfonamide methylimine.
6. A process for the preparation of an N-alkyl alkanesulfonamide bis(alkylimine) of the formula

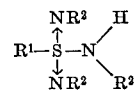

comprising reacting an alkyl mercaptan of the formula

with an alkylchloramine of the formula

in the presence of an alkylamine of the formula $$R^4NH_2$$

wherein, the formulae herein, $R^1$ is selected from the group consisting of straight chain alkyl and branched chain akyl containing from 1 to about 20 carbon atoms, $R^2$ is selected from the group consisting of straight chain alkyl and branched chain alkyl containing from 1 to about 4 carbon atoms, wherein $R^4$ is selected from the group consisting of straight chain alkyl and branched chain alkyl containing from 1 to about 20 carbon atoms, and wherein the molar ratio of said alkylchloramine to said aliphatic mercaptan and of said alkylamine to said aliphatic mercaptan are each in the range of from about 2.5:1 to about 5:1.

7. A process in accordance with claim 6, wherein said molar ratios are each about 3:1.

8. A process in accordance with claim 6, comprising reacting said alkyl mercaptan, said alkylchloramine, and said alkylamine in a compatible, inert organic solvent, under an inert atmosphere, at a temperature of from about −20° C. to about 40° C.

9. A process in accordance with claim 6, wherein $R^1$ is a straight chain alkyl selected from the group consisting of methyl, butyl and dodecyl alkyls, and wherein $R^2$ is methyl.

10. A process for the preparation of an N-alkyl alkanesulfonamide alkylimine of the formula

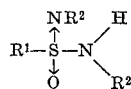

comprising hydrolyzing an N-alkyl alkanesulfonamide bis(alkylimine) of the formula

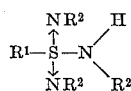

in an aqueous solution of a substantially dissociable, water-soluble, acid; wherein, in the formulae herein, $R^1$ is selected from the group consisting of straight chain alkyl and branched chain alkyl containing from 1 to about 20 carbon atoms, and $R^2$ is selected from the group consisting of straight chain alkyl and branched chain alkyl containing from 1 to about 4 carbon atoms.

11. A process for the preparation of an N,N-dialkyl alkanesulfonamide bis(alkylimine) of the formula

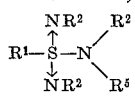

comprising reacting an N-alkyl alkanesulfonamide of the formula

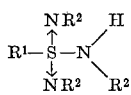

with a strong base selected from the group consisting of sodium hydride, lithium methoxide, and potassium tert-butoxide and alkylating the resulting intermediate with an alkylating agent of the formula

wherein, in the formulae herein, $R^1$ is selected from the group consisting of straight chain alkyl and branched chain alkyl containing from 1 to about 20 carbon atoms; $R^2$ is selected from the group consisting of straight chain alkyl and branched chain alkyl containing from 1 to about 4 carbon atoms; $R^5$ is selected from the group consisting of straight chain alkyl and branched chain alkyl containing from one to about 4 carbon atoms and, wherein Z is selected from the group consisting of (a) a halogen, (b) an alkyl sulfate radical wherein the alkyl contains from 1 to about 4 carbon atoms, (c) an alkanesulfonate radical wherein the alkane moiety contains from 1 to about 4 carbon atoms, and (d) an arylsulfonate radical wherein the aryl is selected from the group consisting of benzene and toluene.

12. A process in accordance with claim 11, wherein said base is sodium hydride.

13. A process for the preparation of an N,N-dialkyl alkanesulfonamide alkylimine of the formula

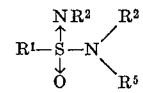

comprising reacting an N-alkyl alkanesulfonamide alkylimine of the formula

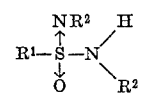

with a strong base selected from the group consisting of sodium hydride, lithium methoxide, and potassium tert-butoxide and alkylating the resulting intermediate with an alkylating agent of the formula

wherein, in the formulae herein, $R^1$ is selected from the group consisting of straight chain alkyl and branched chain alkyl containing from 1 to about 20 carbon atoms; $R^2$ is selected from the group consisting of straight chain alkyl and branched chain alkyl containing from 1 to about 4 carbon atoms; $R^5$ is selected from the group consisting of straight chain alkyl and branched chain alkyl containing from 1 to about 4 carbon atoms; and, wherein Z is selected from the group consisting of (a) a halogen, (b) an alkyl sulfate wherein the alkyl contains from 1 to about 4 carbon atoms, (c) an alkanesulfonate radical wherein the alkane moiety contains from 1 to about 4 carbon atoms, and (d) an arylsulfonate radical wherein the aryl moiety is selected from the group consisting of benzene and toluene.

14. A process in accordance with claim 13 wherein said base is sodium hydride.

15. A process for the preparation of an N,N-dialkyl alkanesulfonamide bis(alkylimine) of the formula

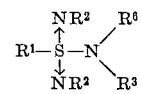

comprising reacting an N,N-dialkyl alkanesulfonamide of the formula

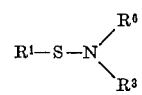

with an alkylchloramine of the formula

in the presence of a dialkylamine of the formula

wherein, in the formulae herein, $R^1$ is selected from the group consisting of straight chain alkyl and branched chain alkyl containing from 1 to about 20 carbon atoms; $R^2$ is selected from the group consisting of straight chain alkyl and branched chain alkyl containing from 1 to about 4 carbon atoms; $R^3$ is selected from the group consisting of hydrogen, straight chain alkyl and branched chain alkyl containing from 1 to about 4 carbon atoms; $R^6$ is a straight chain alkyl containing from 1 to about 20 carbon atoms; wherein $R^3$ and $R^6$ of said N,N-dialkyl alkanesulfonamide are respectively the same as $R^3$ and $R^6$ of said dialkylamine; and further, wherein the molar ratio of said N,N-dialkylsulfonamide to said alkylchloramine is about 1:2.6 and the molar ratio of said N,N-dialkylsulfonamide to said dialkylamine is about 1:6.

16. The process of claim 11 wherein the alkylating agent is selected from the group consisting of methyl iodide, methyl bromide, ethyl chloride, n-butyl bromide, isopropyl chloride, dimethyl sulfate, diethyl sulfate, methyl methanesulfonate, ethyl n-propanesulfonate methyl benzene sulfonate and methyl toluenesulfonate.

17. The process of claim 13 wherein the alkylating agent is selected from the group consisting of methyl iodide, methyl bromide, ethyl chloride, n-butyl bromide, isopropyl chloride, dimethyl sulfate, diethyl sulfate, methyl methanesulfonate, ethyl n-propanesulfonate, methyl benzenesulfonate and methyl toluenesulfonate.

References Cited

UNITED STATES PATENTS 3,445,515  5/1969  Laughlin et al. _____ 260—551

HENRY R. JILES, Primary Examiner

H. I. MOATZ, Assistant Examiner

U.S. Cl. X.R.

252—47